United States Patent [19]

Counts

[11] Patent Number: 4,908,000
[45] Date of Patent: Mar. 13, 1990

[54] SONIC WINDMILL FOR BICYCLES

[76] Inventor: Gerald W. Counts, Irondale, Mo.

[21] Appl. No.: 383,994

[22] Filed: Jul. 24, 1989

[51] Int. Cl.⁴ .............................................. A63H 33/40
[52] U.S. Cl. .................................. 446/216; 446/176; 446/236; 446/404
[58] Field of Search ............... 446/176, 213, 216, 217, 446/218, 26, 27, 28, 236, 237, 265, 404; 73/861.85

[56] References Cited

U.S. PATENT DOCUMENTS

| | | | |
|---|---|---|---|
| 108,535 | 8/1978 | Slaughter | 280/289 |
| 177,155 | 5/1876 | Raffa . | |
| 582,167 | 5/1897 | Bernheimer | 446/217 |
| 1,151,957 | 8/1915 | Lobato | 446/404 |
| 1,206,251 | 11/1916 | Reyholds | 446/217 |
| 1,687,575 | 10/1928 | Lubowsky | 73/861.85 |
| 2,259,615 | 10/1941 | Chappell et al. | 73/861.85 |
| 2,788,612 | 4/1957 | Sametz | 446/404 |
| 2,797,621 | 7/1957 | Gladen | 446/237 X |
| 2,898,704 | 8/1959 | Sattler . | |
| 3,638,355 | 2/1972 | Stoecklin | 446/216 |
| 3,974,369 | 8/1976 | Chmela | 240/6.4 R |
| 4,693,162 | 9/1987 | Lee | 446/213 X |
| 4,752,051 | 6/1988 | Chang | 446/265 X |

Primary Examiner—Robert A. Hafer
Assistant Examiner—Sam Rimell
Attorney, Agent, or Firm—Lewis E. Massie; Andsel Group

[57] ABSTRACT

This invention relates to sound emitting wind wheels mounted on the handle bars of a bicycle. The wind wheels spinning horizontally have wind catching pliable cap-like vanes on the external ends of the flexible horizontal support rods attached to a rotatable hub on the top of a vertical shaft. The vertical shaft utilizing a ball-and-socket clamp arrangement to be compatible with various shaped handle bars.

The cup vanes incorporating an air operated whistle which is activated by air flow generated by forward movement of the bicycle.

1 Claim, 1 Drawing Sheet

SONIC WINDMILL FOR BICYCLES

BACKGROUND OF THE INVENTION

1. Field of the Invention

This invention relates to a sound-emitting windmill actuated by moving air currents. The windmill adapted to be mounted on the handle bars of a bicycle, or the like, will be exposed to moving air currents when the bicycle is in motion. The wind mill having a plurality of horizontal arms terminating in cup-like elements having a converter of air movement-to-sound device exposed to the moving air.

2. Description of the Prior Art

U.S. Pat. No. 2,898,704 Sattler describes a sounding toy that exposes stretched rubber bands to the air flow created by a moving bicycle. The rubber bands excited by the moving air generate a sound. The U.S. Pat. No. 1,151,957 Liobato describes a four blade propeller having a cam on the propeller shaft that contacts a bell to emit a ringing sound. U.S. Pat. No. 2,788,612 Sametz employs a ball rotating in a wind operated pin wheel to strike a bell to generate a tinkling sound.

SUMMARY OF THE INVENTION

The instant invention employs a plurality of equal length horizontal flexible rods rotating around the top end of a vertical support shaft attached to the handlebar portion of a bicycle. The external ends of the horizontal rods having a pliable cup like wind vane with its longitudinal axis normal to the horizontal rod. An orifice in the center of the cup configured as an air operated whistle. As the moving bicycle generates an air flow the air imparts a rotational movement to the horizontal arms by means of the vanes. Simultaneously the air flow through the whistle generates a whistling sound. There being no rigid or sharp members of the assembly that can cause bodily injury if inadvertently contacted.

DETAILED DESCRIPTION OF THE PREFERRED EMBODIMENTS

Figure 1:
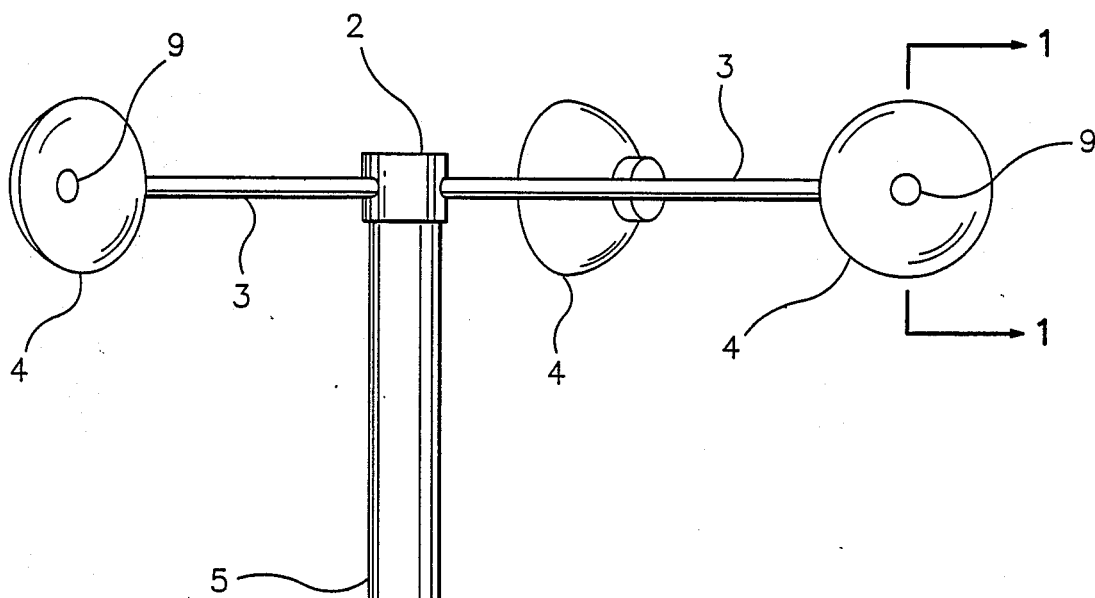
FIG. 1 is a top front perspective view of the sonic wind mill mounted on the bicycle.
Figure 2:
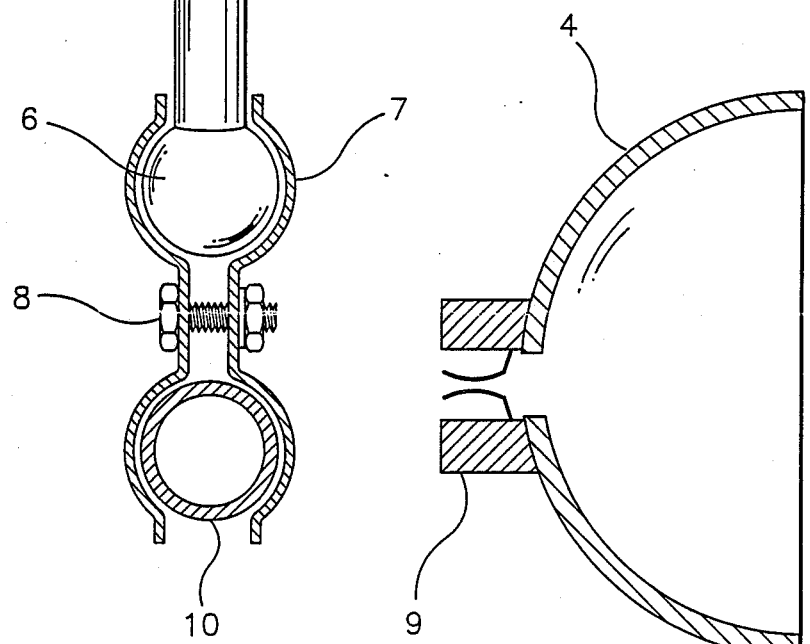
FIG. 2 is a sectional view through 1—1 of FIG. 1.

Referring to FIG. 1 the horizontal flexible rods 3 are attached to central hub cap 2 which is rotatable around the top of vertical shaft 5. The pliable vane cups 4 with whistle 9 are attached to the external ends of the rod 3.

The vertical shaft extending downwards to a ball fitting nesting in the socket clamp 7. The clamp 7 is adjustably fastened to a portion of the bicycle handle bar 10.

I claim:

1. A horizontal wind vane rotating around a vertical shaft affixed to the handle bar of a bicycle wherein the improvement comprises:
    (a) a plurality of equal length rods extending radially from a central hub rotatable around the top of a vertical shaft;
    (b) cup shaped wind vanes affixed to the external ends of a radial rods;
    (c) the axis of the cup shaped vanes normal to the axis of the radial rods;
    (d) the axis of the cup vanes having an axial orifice accommodating an air operated whistle element;
    (e) the vertical shaft extending downwards to a ball fitting nesting in a socket clamp;
    (f) the socket clamp having a socket arrangement on one end;
    (g) the second end of the clamp having a circulator portion for clamping on the bicycle handle bar; and
    (h) the clamp secured to the ball fitting/handle bar by a mid-section threadable member.

* * * * *